United States Patent
Togawa et al.

(10) Patent No.: US 10,403,289 B2
(45) Date of Patent: Sep. 3, 2019

(54) VOICE PROCESSING DEVICE AND VOICE PROCESSING METHOD FOR IMPRESSION EVALUATION

(71) Applicant: FUJITSU LIMITED, Kawasaki-shi, Kanagawa (JP)

(72) Inventors: Taro Togawa, Kawasaki (JP); Chisato Shioda, Kawasaki (JP); Sayuri Kohmura, Kawasaki (JP); Takeshi Otani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/952,446

(22) Filed: Nov. 25, 2015

(65) Prior Publication Data
US 2016/0217791 A1 Jul. 28, 2016

(30) Foreign Application Priority Data
Jan. 22, 2015 (JP) .................................. 2015-010342

(51) Int. Cl.
G10L 17/02 (2013.01)
G10L 17/00 (2013.01)
G10L 17/08 (2013.01)
G10L 25/51 (2013.01)
G10L 25/87 (2013.01)

(52) U.S. Cl.
CPC ............ *G10L 17/02* (2013.01); *G10L 17/005* (2013.01); *G10L 17/08* (2013.01); *G10L 25/51* (2013.01); *G10L 25/87* (2013.01)

(58) Field of Classification Search
CPC ....... G10L 17/08; G10L 17/005; G10L 17/02; G10L 25/51

USPC .......................... 704/254, E19.001, E19.011
See application file for complete search history.

(56) References Cited

U.S. PATENT DOCUMENTS 5,432,886 A 7/1995 Tsukada et al.
6,202,049 B1 * 3/2001 Kibre ...................... G10L 13/07
704/254

(Continued)

FOREIGN PATENT DOCUMENTS

JP 04-255900 9/1992
JP 2007-184699 7/2007

(Continued)

OTHER PUBLICATIONS

CNOA—Office Action of Chinese Patent Application No. 201510920109.1 dated Mar. 5, 2019 with English Translation.

*Primary Examiner* — Daniel C Washburn
*Assistant Examiner* — Oluwadamilola M Ogunbiyi
(74) *Attorney, Agent, or Firm* — Fujitsu Patent Center

(57) ABSTRACT

A voice processing device includes: a processor; and a memory which stores a plurality of instructions, which when executed by the processor, cause the processor to execute: detecting a first utterance section included in a first voice and a second utterance section included in a second voice; specifying an overlapping section within which the first utterance section and the second utterance section overlap with each other; calculating a first utterance continuation section from a start point of the overlapping section to an end point of the first utterance section; and evaluating an impression regarding the first voice at least on the basis of information relating to a length of the first utterance continuation section.

18 Claims, 8 Drawing Sheets

(56) References Cited

U.S. PATENT DOCUMENTS

| | | | | |
|---|---|---|---|---|
| 6,363,145 | B1* | 3/2002 | Shaffer | H04M 3/2281 379/265.02 |
| 6,438,522 | B1* | 8/2002 | Minowa | G10L 13/08 704/258 |
| 2006/0271372 | A1* | 11/2006 | Escott | G11B 27/038 704/278 |
| 2007/0154006 | A1 | 7/2007 | Onodera et al. | |
| 2009/0192794 | A1* | 7/2009 | Akamatsu | G10L 25/48 704/230 |
| 2011/0071825 | A1 | 3/2011 | Emori et al. | |
| 2011/0282662 | A1* | 11/2011 | Aonuma | G10L 17/26 704/231 |
| 2012/0020505 | A1* | 1/2012 | Yamada | G10L 25/48 381/313 |
| 2012/0253807 | A1* | 10/2012 | Kamano | G10L 25/63 704/240 |

FOREIGN PATENT DOCUMENTS

| | | |
|---|---|---|
| JP | 2009-258366 | 11/2009 |
| JP | 2010-130466 | 6/2010 |
| JP | 2010-175984 | 8/2010 |
| JP | 2014-123813 | 7/2014 |
| WO | 2009/145192 | 12/2009 |

\* cited by examiner

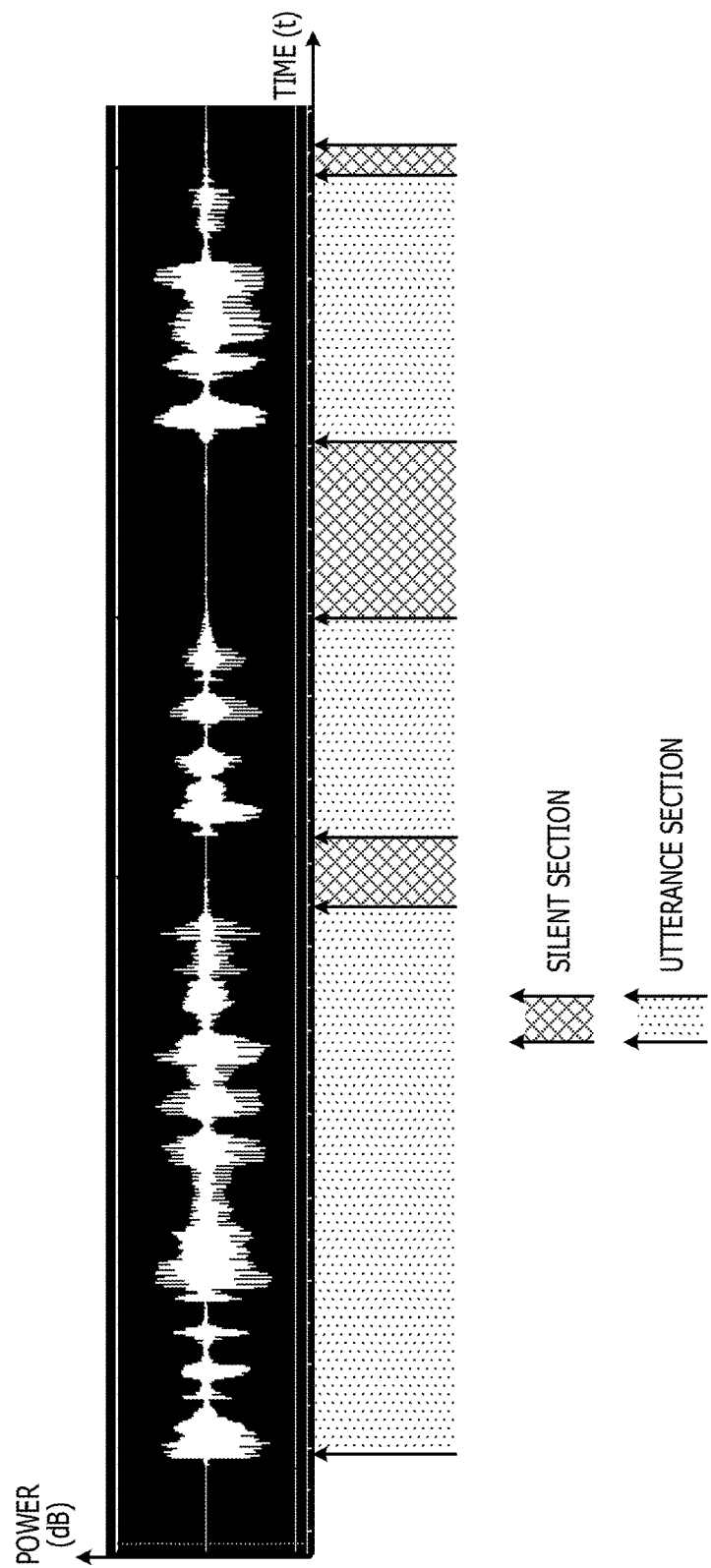

FIG. 6

| FIRST UTTERANCE CONTINUATION SECTION | EVALUATION RESULT |
|---|---|
| EQUAL TO OR LONGER THAN ZERO SECOND BUT SHORTER THAN THREE SECONDS | NORMAL |
| EQUAL TO OR LONGER THAN THREE SECONDS BUT SHORTER THAN FOUR SECONDS | RATHER BAD |
| EQUAL TO OR LONGER THAN FOUR SECONDS | VERY BAD |

VOICE PROCESSING DEVICE AND VOICE PROCESSING METHOD FOR IMPRESSION EVALUATION

CROSS-REFERENCE TO RELATED APPLICATION

This application is based upon and claims the benefit of priority of the prior Japanese Patent Application No. 2015-010342, filed on Jan. 22, 2015, the entire contents of which are incorporated herein by reference.

FIELD

The embodiments disclosed herein relate, for example, to a voice processing device, a voice processing method and a medium in which a voice processing program is stored.

BACKGROUND

In recent years, together with development of information processing equipment, situations in which conversation is performed through a telephone call application installed, for example, in a portable terminal or a personal computer are increasing. When a person talks with an opponent, if they proceed with the dialogue while they understand thoughts of the partners of them, then smooth communication may be implemented. In this case, in order for each of them to sufficiently understand the thought of its partner, it is desirable for each of them to utter without interrupting the utterance of the partner. Therefore, a technology for evaluating an impression regarding an interruption of the utterance of the partner from input voice is demanded in order to know whether or not smooth communication is being implemented successfully. For example, in call meetings in a company or the like, the technology may be used in extraction of a problem of communication in the organization by evaluating an impression regarding utterances for each worker. It is to be noted that, as a related prior art document, for example, Japanese Laid-open Patent Publication No. 2010-175984 is available.

SUMMARY

According to an aspect of the embodiments, a voice processing device includes: a processor; and a memory which stores a plurality of instructions, which when executed by the processor, cause the processor to execute: detecting a first utterance section included in a first voice of a first user and a second utterance section included in a second voice of a second user; specifying an overlapping section within which the first utterance section and the second utterance section overlap with each other; calculating a first utterance continuation section from a start point of the overlapping section to an end point of the first utterance section; and evaluating an impression regarding the first voice at least on the basis of information relating to a length of the first utterance continuation section.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 4 is a view illustrating a detection result within a first utterance section and a first silent section by a detection unit;

FIG. 6 is an association table between first utterance continuation sections and impressions regarding utterances;

DESCRIPTION OF EMBODIMENTS

In the following, working examples of a voice processing device, a voice processing method and a medium in which a voice processing program is stored according to one embodiment are described. It is to be noted that the working example does not restrict the technology disclosed herein.

Working Example 1

Figure 1:
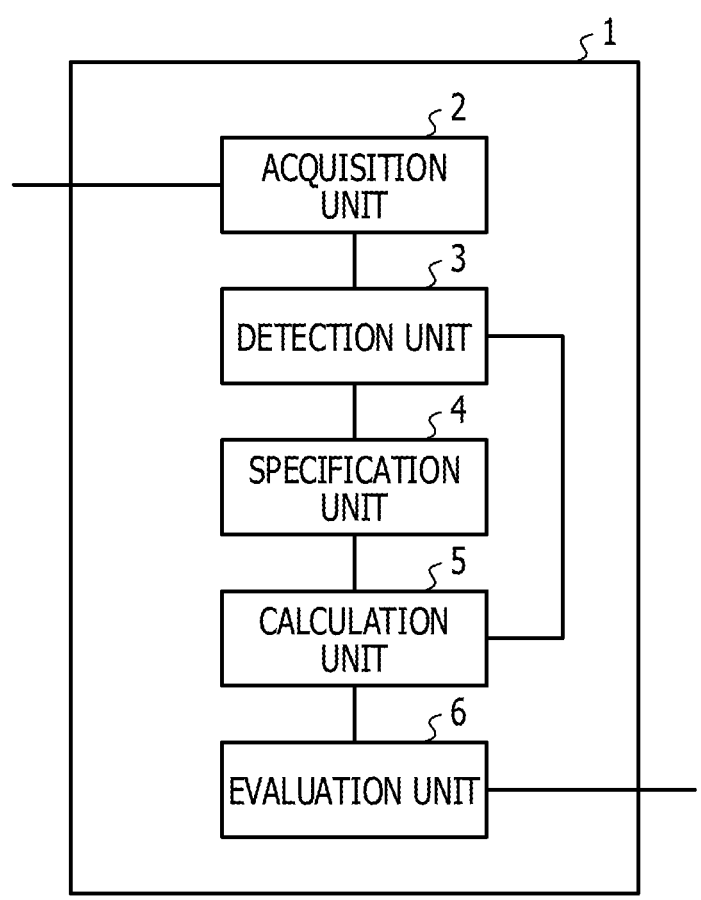
FIG. 1 is a functional block diagram of a voice processing device according to a first embodiment.
Figure 2:
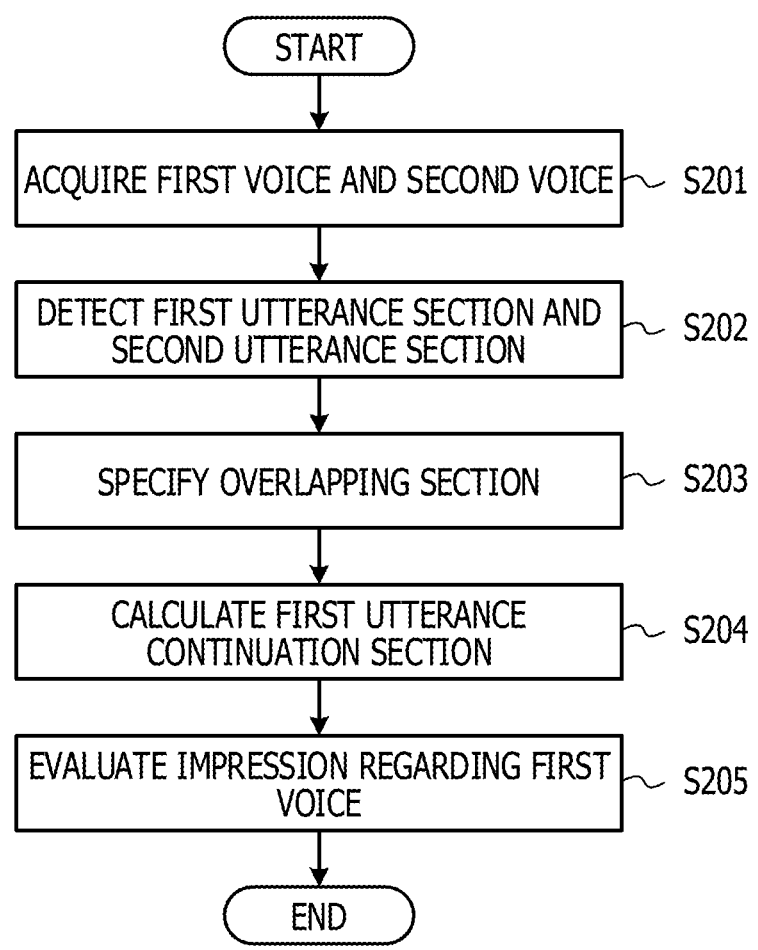
FIG. 2 is a flow chart of a voice processing method by a voice processing device.

FIG. 1 is a functional block diagram of a voice processing device according to a first embodiment. A voice processing device 1 includes an acquisition unit 2, a detection unit 3, a specification unit 4, a calculation unit 5, and an evaluation unit 6. FIG. 2 is a flow chart of a voice process of a voice processing device. The voice processing device illustrated in FIG. 2 may be the voice processing device 1 illustrated in FIG. 1. In the description of the working example 1, a flow of the voice process by the voice processing device 1 depicted in FIG. 2 is described in association with description of functions of the functional block diagram of the voice processing device 1 depicted in FIG. 1.

The acquisition unit 2 is a hardware circuit, for example, by wired logic. Otherwise, the acquisition unit 2 may be a functional module implemented by a computer program executed by the voice processing device 1. The acquisition unit 2 acquires a first voice of a first user and a second voice of a second user, which are examples of input voices, for example, through an external device. It is to be noted that the process just described corresponds to step S201 of the flow chart depicted in FIG. 2. Here, the first voice is transmission voice indicating a voice, for example, uttered by the first user (who may be referred to as oneself) who uses the voice processing device 1 to the second user (who may be referred to as opponent) who is a conversational partner of the first user. Meanwhile, the second voice is a reception voice of the first user indicating a voice, for example, uttered by the second user to the first user. It is to be noted that the transmission voice may be a second voice of the second user and the reception voice may be the first voice of the first user. The acquisition unit 2 is, for example, coupled to or disposed in the voice processing device 1. It is possible for the acquisition unit 2 to acquire transmission voice from a microphone not depicted (which corresponds to the external device described hereinabove). Further, although the first voice and the second voice are voices of, for example, the Japanese language, they may otherwise be voices of a different language such as the English language. In other words, the voice process in the working example 1 has no language dependence. The acquisition unit 2 outputs the acquired first voice and second voice to the detection unit 3.

The detection unit 3 is a hardware circuit, for example, by wired logic. The detection unit 3 may otherwise be a functional module implemented by a computer program executed by the voice processing device 1. The detection unit 3 receives a first voice and a second voice from the acquisition unit 2. The detection unit 3 detects a first expiration section indicative of a first utterance section (which may be referred to as first voiced section) included in the first voice. Further, the detection unit 3 detects a second expiration section indicative of a second utterance section (which may be referred to as second voiced section) included in the second voice. It is to be noted that the process just described corresponds to step S202 of the flow chart depicted in FIG. 2. The first or second expiration section is a section, for example, after the first or second user starts an utterance after performing inspiration during its utterance until the first or second user performs inspiration (in other words, a section between a first respiration and a second respiration or a section within which an utterance continues). The detection unit 3 detects an average signal-to-noise ratio (SNR) that is an example of a signal quality (which may be referred to as first signal-to-noise ratio or second signal-to-noise ratio) from a plurality of frames, for example, included in the first or second voice. The detection unit 3 may thus detect a section within which the average SNR satisfies a given condition for a first or second utterance section. Further, the detection unit 3 detects an inspiration section included in the first or second voice and indicative of a silent section continuing to a trailing end of a first or second utterance section. The detection unit 3 may detect, for example, a section within which the average SNR described hereinabove does not satisfy the given condition as a first silent section or a second silent section (or in other words, a first inspiration section or a second inspiration section).

Figure 3:
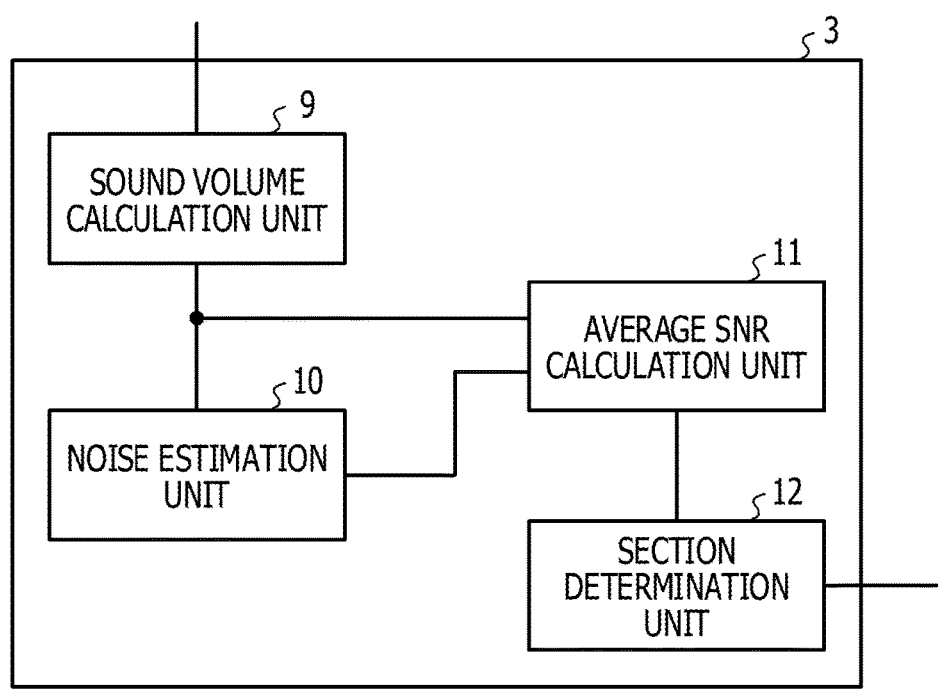
FIG. 3 is a functional block diagram of a detection unit according to one embodiment.

Here, a detection process of the first or second utterance section or the first or second silent section by the detection unit 3 is described in detail. It is to be noted that the detection method of the second utterance section may be performed using the detection method of the first utterance section and the detection method of the second silent section may be performed using the detection method of the first silent section. Therefore, in the description of the working example 1, details of the detection process of the first utterance section and the first silent section by the detection unit 3 are described. FIG. 3 is a functional block diagram of a detection unit according to one embodiment. The detection unit illustrated in FIG. 3 may be the detection unit 3 illustrated in FIG. 1. The detection unit 3 includes a sound volume calculation unit 9, a noise estimation unit 10, an average SNR calculation unit 11, and a section determination unit 12. It is to be noted that the detection unit 3 need not necessarily include the sound volume calculation unit 9, the noise estimation unit 10, the average SNR calculation unit 11, and the section determination unit 12, but the functions of the units may be implemented by a plurality of hardware circuits by wired logic. Alternatively, the functions of the units included in the detection unit 3 may be implemented by functional modules implemented by a computer program executed by the voice processing device 1 in place of the hardware circuits by wired logic.

Referring to FIG. 3, a first voice is inputted to the sound volume calculation unit 9. It is to be noted that the sound volume calculation unit 9 may include a buffer or a cache of a length M not depicted. The sound volume calculation unit 9 calculates the sound volume of a frame included in the first voice and outputs the sound volume to the noise estimation unit 10 and the average SNR calculation unit 11. It is to be noted that the length of each of frames included in the first voice is, for example, 20 milliseconds. The sound volume S(n) of each frame may be calculated in accordance with the following expression:

$$S(n) = \sum_{t=n*M}^{(n+1)*M-1} c(t)^2 \qquad \text{(Expression 1)}$$

where n is a frame number applied successively to each frame from the start of inputting of the acoustic frames included in the first voice (n is an integer equal to or greater than 0), M a time length of one frame, t time, and c(t) an amplitude (electric power) of the first voice.

The noise estimation unit 10 receives the sound volumes S(n) of the frames from the sound volume calculation unit 9. The noise estimation unit 10 estimates noise in each frame and outputs a noise estimation result to the average SNR calculation unit 11. Here, the noise estimation for each frame by the noise estimation unit 10 may be performed using, for example, a (noise estimation method 1) or a (noise estimation method 2) described below.

Noise Estimation Method 1

The noise estimation unit 10 may estimate the magnitude (electric power) N(n) of noise in the frame n in accordance with the following expression on the basis of the sound volume S(n) in the frame n, the sound volume S(n−1) and the magnitude N(n−1) of noise in the preceding frame (n−1):

$$N(n) = \begin{cases} \alpha \cdot N(N-1) + (1-\alpha) \cdot S(n), & \text{(in case of } |S(n-1) - S(n)| < \beta) \\ N(n-1) & \text{(in any other case)} \end{cases} \qquad \text{(Expression 2)}$$

where α and β are constants, which may be determined experimentally. For example, α and β may be α=0.9 and β=2.0, respectively. Also the initial value N(−1) of the noise power may be determined experimentally. If, in the (expression 2) above, the sound volume S(n) of the frame n does not exhibit a variation by an amount equal to or greater than the fixed value β with respect to the sound volume S(n−1) of the preceding frame n−1, then the magnitude N(n) of the frame n is updated. On the other hand, if the sound volume S(n) of the frame n exhibits a variation by an amount equal to or greater than the fixed value β with respect to the sound value S(n−1) of the preceding frame n−1, then the noise power N(n−1) of the preceding frame n−1 is set as the magnitude N(n) of the frame n. It is to be noted that the magnitude N(n) may be referred to as noise estimation result described hereinabove.

Noise Estimation Method 2

The noise estimation unit 10 may perform updating of the magnitude of noise on the basis of the ratio between the sound volume S(n) of the frame n and the noise power N(n−1) of the preceding frame n−1 using the following (expression 3):

$$N(n) = \begin{cases} \alpha \cdot N(n-1) + (1-\alpha) \cdot S(n), & \text{(in case of } (S(n) < \\ & \gamma \cdot N(n-1)) \\ N(n-1) & \text{(in any other case)} \end{cases} \quad \text{(Expression 3)}$$

where γ is a constant, which may be determined experimentally. For example, γ may be set to γ=2.0. Also the initial value N(n−1) of the noise power may be determined experimentally. If, in the (expression 3) above, the sound volume S(n) of the frame n does not exhibit a variation by an amount smaller than the fixed value γ with respect to the noise power N(n−1) of the preceding frame n−1, then the magnitude N(n) of the frame n is updated. On the other hand, if the sound volume S(n) of the frame n exhibits a variation by an amount equal to or greater than the fixed value γ with respect to the noise power N(n−1) of the preceding frame n−1, then the noise power N(n−1) of the preceding frame n−1 is set as the magnitude N(n) of the frame n.

Referring to FIG. 3, the average SNR calculation unit 11 receives the sound volume S(n) of each frame from the sound volume calculation unit 9 and receives the magnitude N(n) of each frame of a noise estimation result from the noise estimation unit 10. It is to be noted that the average SNR calculation unit 11 includes a cache or a memory not depicted and retains the sound value S(n) and the magnitude N(n) for L frame in the past. The average SNR calculation unit 11 calculates an average SNR in an analysis target time period (frames) in accordance with the following expression given below and outputs the average SNR to the section determination unit 12.

$$SNR(n) = \frac{1}{L} \sum_{i=0}^{L-1} \frac{S(n-i)}{N(n-i)} \quad \text{(Expression 4)}$$

where L may be set to a value greater than a general length of an assimilated sound and may be set, for example, to a frame number corresponding to 0.5 millisecond.

The section determination unit 12 receives the average SNR from the average SNR calculation unit 11. The section determination unit 12 decides in a unit of one frame whether the frame is an utterance section or a silent section (no-utterance section) in accordance with the following expression given below and outputs a decision result $v_1(t)$.

$v_1(t)=1$ (utterance section)

$v_1(t)=0$ (silent section) (5)

where t indicates the frame number in the (expression 5) above. It is to be noted that one frame has a length of, for example, 20 milliseconds. Further, the (expression 5) above signifies that, if it is decided that the first voice in the first frame indicates an utterance section, then $v_1(t)=1$ is substituted, but if it is decided that the first voice in the first frame indicates a silent section, then $v_1(t)=0$ is substituted. The section determination unit 12 outputs a frame section that continuously satisfies $v_1(t)=1$ as a first utterance section. It is to be noted that the section determination unit 12 calculates a decision result $v_2(t)$ regarding the second voice using a technique similar to that used for $v_1(t)$ and outputs a second utterance section.

FIG. 4 is a view depicting a detection result of a first utterance section and a first silent section by a detection unit. The detection unit described with reference to FIG. 4 may be the detection unit 3 illustrated in FIG. 1. In FIG. 4, the axis of abscissa indicates time and the axis of ordinate indicates the sound volume (amplitude) of the first voice. As depicted in FIG. 4, a section continuous to a rear end of each first utterance section is detected as a first silent section. Further, as depicted in FIG. 4, in detection of a first utterance section by the detection unit 3 disclosed in the working example 1, noise is learned in accordance with ambient noise and decides an utterance section on the basis of the SNR. Therefore, erroneous detection of a first utterance section by ambient noise may be minimized. Further, since the average SNR is calculated from a plurality of frames, even if a first utterance section includes an instantaneous period of time within which no sound is detected, the first utterance section may be extracted as a continuous utterance section. It is to be noted that it is possible for the detection unit 3 to use a method disclosed in International Publication Pamphlet No. WO 2009/145192. It is to be noted that, as described hereinabove, a technique similar to that of the detection method of a first utterance section may be used for the detection method of a second utterance section, and a technique similar to that of the detection method of a first silent section may be used for the detection method of a second silent section. Therefore, the detection unit 3 outputs the first utterance section and the second utterance section detected thereby to the specification unit 4 and the calculation unit 5.

Referring back to FIG. 1, the specification unit 4 is a hardware circuit, for example, by wired logic. Alternatively, the specification unit 4 may be a functional module implemented by a computer program executed by the voice processing device 1. The specification unit 4 accepts a first utterance section and a second utterance section detected by the detection unit 3 from the detection unit 3. The specification unit 4 specifies an overlapping section within which the first and second utterance sections overlap with each other. It is to be noted that the process just described corresponds to step S203 of the flow chart depicted in FIG. 2. The overlapping section may be defined as a section within which the first and second users utter to each other at any arbitrary point of time. It is to be noted that the specification unit 4 may specify the overlapping section L(t) in accordance with the following expression:

if $\{v_1(t)=0\} \vee \{v_2(t)=0\}$ $L(t)=0$ else $L(t)=L(t-1)+1$ (6)

The (expression 6) above signifies that a frame number (overlapping section number) in which overlapping continues is calculated by specifying that, with regard to a frame in which one of the first voice of the first user and the second voice of the second user is in a silent section (no-utterance section), the overlapping time period is 0 (there is no appearance of an overlapping section) but adding, with regard to a frame in which both of the first voice of the first user and the second voice of the second user are in an utterance section, one frame to an overlapping time period up to the immediately preceding frame. The specification unit 4 outputs the specified overlapping section to the calculation unit 5.

Referring to FIG. 1, the calculation unit 5 is a hardware circuit, for example, by wired logic. The calculation unit 5 may otherwise be a functional module implemented by a computer program executed by the voice processing device 1. The calculation unit 5 receives an overlapping section specified by the specification unit 4 from the specification unit 4. Further, the calculation unit 5 receives first and second utterance sections from the detection unit 3. The calculation unit 5 calculates a first utterance continuation section that is a section from a start point of the overlapping section to an end point of the first utterance section. It is to be noted that this process corresponds to step S204 of the flow chart depicted in FIG. 2. More particularly, the calculation unit 5 executes the following calculation process.

The calculation unit 5 outputs start point time $T_s$ of an overlapping section (which may be referred to overlap appearance section time $T_s$) on the basis of a result of comparison between the overlapping section L(t) and an arbitrary first threshold value TH_L. The calculation unit 5 decides, for example, in accordance with the following expression given below, that an overlapping section has appeared when (the length of) an overlapping section is equal to or longer than the first threshold value, and outputs the start point time $T_s$ of the overlapping section. If the overlapping section is shorter than the first threshold value, then the calculation unit 5 decides that no overlapping section has appeared and resets the overlap appearance section time $T_s$ in accordance with the following expression given below. Here, the first threshold value may be a value that corresponds to a general length of a supportive response. Since the supportive response indicates a response of consent or the like to an utterance of an opponent, it may need not be treated as an interruption of conversation. It is to be noted that the first threshold value TH_L may be set, for example, to one second (which corresponds to 50 frames).

$$\text{if } \{L(t) \geq TH\_L\} \ T_s = t - TH\_L$$

$$\text{else } T_s = -1 \tag{7}$$

The (expression 7) above indicates that, where the condition of L(t) TH_L is satisfied, an overlapping section has appeared, and the calculation unit 5 calculates the start point time $T_s$ of the overlapping section, but where the condition of L(t) TH_L is not satisfied, no overlapping section has appeared.

If the condition of L(t) TH_L in (expression 7) above is satisfied, then the calculation unit 5 calculates time $T_e$ that is an end point of the first utterance section in accordance with the following expression on the basis of $v_1(t)$ calculated using the (expression 5) given hereinabove.

$$\text{if } \{v_1(t-1)=1\} \wedge \{v_1(t)=0\} \ T_e = t - 1$$

$$\text{else } T_e = -1 \tag{8}$$

The (expression 8) above signifies that, when it is decided that the immediately preceding frame (t−1) is decided to be an utterance section and besides it is decided that the current frame (t) is a silent section (no-utterance section), the utterance is ended and the immediately preceding frame (t−1) is calculated as time $T_e$ that is an end point of the first utterance section. In any other case, since an utterance section continues or the immediately preceding frame (t−1) and the current frame (t) are in a non-utterance section, the utterance end time $T_e$ is reset.

When the calculation unit 5 calculates the time $T_e$ of the end point of the first utterance section, it calculates a first utterance continuation section CL in accordance with the following expression from the start point time $T_s$ of the overlapping section and the time $T_e$ of the end point of the first utterance section.

$$CL = T_e - T_s \tag{9}$$

Figure 5A:
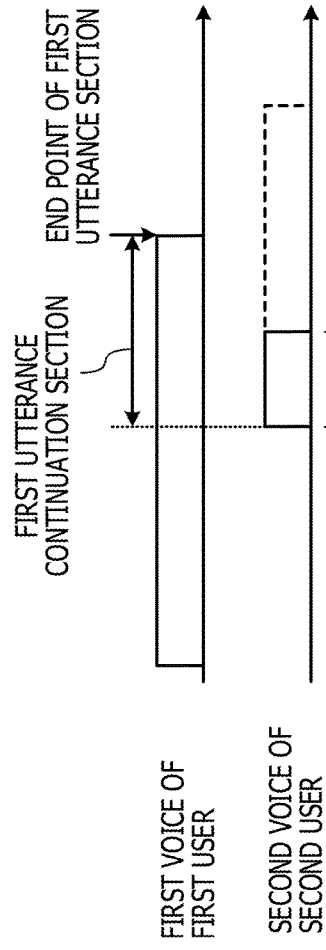
FIG. 5A is a first conceptual diagram of a first utterance continuation section and FIG. 5B is a second conceptual diagram of a first utterance continuation section.
Figure 5B:
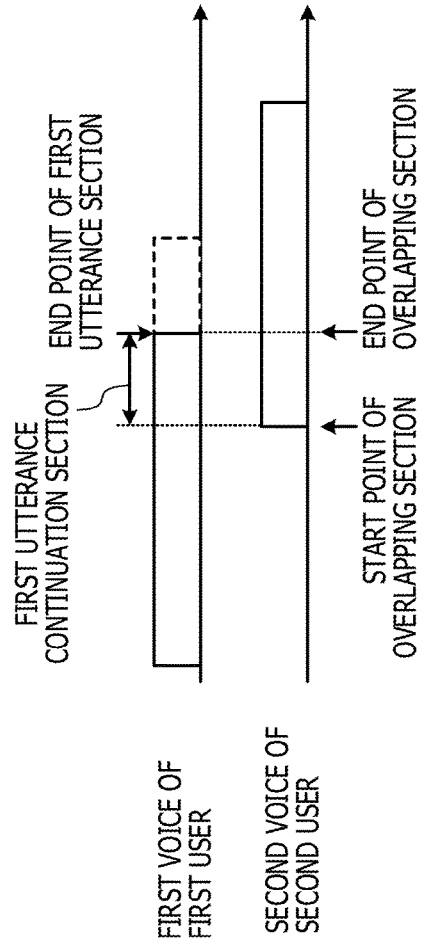

FIG. 5A is a first conceptual diagram of a first utterance continuation section. FIG. 5B is a second conceptual diagram of a first utterance continuation section. In FIGS. 5A and 5B, the first user starts its utterance earlier than the second user. Further, a region surrounded by solid lines is a "region" within which the first or second user is actually "uttering" contents intended thereby while a region surrounded by broken lines is a "region" within which, due to appearance of an overlapping section, the first or second user is actually "not uttering" contents intended thereby. In FIG. 5A, the first voice of the first user (voice being actually uttered) is, for example, "Let's go to mountain this weekend. Autumn leaves are very beautiful." On the other hand, the second voice of the second user (voice uttered actually) is "However, the weather." At this time, the second user does not utter "is not good. Therefore, let's go to mountain on a different day" and although the second user starts its utterance during the utterance of the first user, the first user does not stop the utterance but is placed into a state in which the first user continues its utterance to the end. In this case, the impression regarding the utterance of the first user given to the second user is unfavorable.

Referring to FIG. 5B, the first voice of the first user (voice being actually uttered) is, for example, "Let's go to mountain this weekend." Meanwhile, the second voice of the second user (voice being uttered actually) is "However, the weather is not good. Therefore, let's go to mountain on a different day." At this time, since the second user starts its utterance during utterance of the first user, the first user stops the utterance midway without continuing the utterance to the end. In this case, although details are hereinafter described, the impression regarding the utterance of the first user given to the second user is not bad. In the working example 1, if the first user turns over the utterance to the second user during utterance of the first user, then it is possible to evaluate the impression regarding the utterance of the first user by making use of the nature that the time from a start point of an overlapping section within which the utterance sections overlap with each other to a point of time at which the first user interrupts its utterance is short. The calculation unit 5 outputs the calculated first utterance continuation section to the evaluation unit 6.

Referring back to FIG. 1, the evaluation unit 6 is a hardware circuit, for example, by wired logic. Alternatively, the evaluation unit 6 may be a functional module implemented by a computer program executed by the voice processing device 1. The evaluation unit 6 receives the first utterance continuation section calculated by the calculation unit 5 from the calculation unit 5. The evaluation unit 6 evaluates an impression regarding the first voice given to the second user at least on the basis of information relating to the length of the first utterance continuation section. It is to be noted that this process corresponds to step S205 of the flow chart depicted in FIG. 2.

FIG. 6 is an association table between first utterance continuation sections and impressions regarding utterances. It is to be noted that an association table 60 of FIG. 6 has been found out newly as a result of intensive studies of the inventors of the present embodiment. Further, the association table 60 of FIG. 6 is based on subjective evaluations of a plurality of evaluators. It is to be noted that, as the evaluation method, an impression regarding the utterance of the first user given to the second user was determined experimentally on the basis of the first utterance continuation section (which may be referred to as first utterance continuation time period) in the case where, while the first user was continuing its utterance, the second user began to utter such that an overlapping section appeared. It is to be noted that the subjective evaluations were classified into three stages of "the impression is not bad (the utterance is not substantially interrupted)," "the impression is rather bad (the utterance is substantially interrupted a little," and "the impression is bad (the utterance is substantially interrupted)." As may be recognized from the association table 60 of FIG. 6, if the first utterance continuation section (in other words, the period of time after a start of overlapping between the first and second voices to an end of the utterance of the evaluated person) is shorter than three seconds, then it does not become that the conversation of the second user (opponent) is interrupted, and it became apparent that the impression regarding the utterance of the first user (oneself) is not bad. In other words, when the opponent (corresponding to the second user) and the oneself (corresponding to the first user) have a conversation, it is one of significant factors for the oneself to establish the conversation without interrupting an utterance of the opponent with an utterance of the oneself in order to know whether or not smooth communication is implemented successfully. When oneself and the opponent have a conversation, if an utterance of the opponent is interrupted by an utterance of the oneself, then the impression regarding the oneself given to the opponent becomes bad, and this makes it difficult to smoothly proceed with the communication.

The evaluation unit 6 outputs an evaluation result to an arbitrary external device on the basis of the first utterance continuation section and the association table 60 of FIG. 6. It is to be noted that the evaluation unit 6 may replace the evaluation result into an arbitrary score and use the score to evaluate the utterance. Further, the external device may be, for example, a speaker that may reproduce the evaluation result after the evaluation result is converted into voice or a display unit that displays the evaluation voice as character information. Further, where the evaluation result is outputted to a speaker, the evaluation unit 6 may use a known arbitrary voice reading method. Also, where the evaluation result is "rather bad" or "very bad," the evaluation unit 6 may transmit a given control signal to the external device. It is to be noted that, where this process is performed, it may be performed together with the process at step S205 of the flow chart depicted in FIG. 2. The control signal may be, for example, alarm sound. Also, where the length of the first utterance continuation section is equal to or longer than an arbitrary sixth threshold value (for example, the sixth threshold value=three seconds), the evaluation unit 6 may evaluate the impression regarding the utterance of the first user as low evaluation.

Here, a comparative example corresponding to the working example 1 is described. In the comparative example, an impression regarding the first user given to the second user is evaluated simply on the basis of the length of an overlapping section without using the first utterance continuation section. In FIGS. 5A and 5B, it may be recognized that the overlapping sections have an equal length. In FIG. 5A, after appearance of the overlapping section, the first user continues its utterance while the second user stops its utterance. In FIG. 5B, after appearance of the overlapping section, the first user stops its utterance while the second user continues its utterance. If the impression regarding the utterance of the first user is evaluated replacing, for example, the item of the first utterance continuation section of the association table 60 of FIG. 6 with the length of the overlapping section, then in the utterance pattern depicted in FIG. 5A, the impression regarding the utterance of the first user is evaluated as being bad. Therefore, no particular problem arises. However, if the evaluation result in the working example 1 is taken into consideration, then the utterance pattern depicted in FIG. 5B gives rise to a false result of detection that, although the impression regarding the utterance of the first user is not bad, the impression regarding the utterance of the first user is evaluated bad. Therefore, where an impression regarding an utterance is evaluated simply on the basis of the overlapping time period between the utterance sections of the first and second users as described in the description of the comparative example, it is difficult to accurately evaluate an impression regarding an utterance. In contrast, since, in the working example 1, an impression regarding an utterance is evaluated, for example, on the basis of the first utterance continuation section, it may be recognized that the impression regarding the utterance may be evaluated accurately. With the voice processing device 1 in the working example 1, it is possible to evaluate an impression regarding an utterance of the first user given to the second user.

Working Example 2

The specification unit 4 depicted in FIG. 1 may otherwise calculate the number of vowels included in a first or second utterance section and specify an overlapping section when the first and second utterance sections overlap with each other in terms of the number of vowels equal to or greater than a given second threshold value (for example, the second threshold value=five). In other words, since the number of vowels of a majority of words corresponding generally to supportive responses such as, for example, "yes," "no," "yeah," "really?," or "right" is, for example, four, the specification unit 4 may decide that, if the number of vowels included in the first or second utterance section is smaller than the second threshold value, then the first or second utterance section corresponds to a mere supportive response. Since the utterance in this instance does not disturb the conversation, it is possible for the specification unit 4 not to handle the section of the word as an overlapping section of the first and second utterance sections. It is to be noted that the calculation unit 5 may use, as a detection method of the number of vowels based on a Formant distribution, a method disclosed, for example, in Japanese Laid-open Patent Publication No. 2009-258366.

Further, the specification unit 4 may recognize the first or second utterance section as a character string. As a method for recognizing the first or second utterance section as a character string, the specification unit 4 may apply a method disclosed in Japanese Laid-open Patent Publication No. 04-255900. Further, given words are words corresponding to supportive responses and stored in a word list (table) stored in a cache or a memory not depicted provided in the calculation unit 5. The given words may be words that generally correspond to supportive responses such as, for example, "yes," "no," "yeah," "really?," or "right." If the first or second utterance section coincides with one of the given words, then since the first or second utterance section corresponds to a mere supportive response and does not make an obstacle to the conversion, it is possible for the specification unit 4 not to handle the section of the word as an overlapping section between the first and second utterance sections. It is to be noted that the voice processing device 1 may perform a voice process of a combination of the processes of the working example 2 and the working example 1. With the voice processing device 1 according to the working example 2, an impression regarding an utterance of the first user given to the second user may be evaluated with a higher degree of accuracy.

Working Example 3

The specification unit 4 depicted in FIG. 1 may otherwise specify an overlapping section after lapse of time of an arbitrary fifth threshold value (for example, the fifth threshold value=30 seconds) after start time of an earlier one of the first and second utterance sections. An utterance immediately after starting of conversation in most cases is a greeting that does not have an influence on an utterance impression even if the overlapping time section is long. Therefore, the decision accuracy may be improved by excluding an utterance immediately after starting of conversation from a target section for decision of an impression regarding an utterance. Further, the specification unit 4 may specify an overlapping section after lapse of the fifth threshold value after end time of a later one of the first and second utterance sections. An utterance immediately before ending of conversion in most cases is a greeting that does not have an influence on an utterance impression even if the overlapping section is long. Therefore, the decision accuracy may be improved by excluding an utterance immediately before ending of conversation from a target section for decision of an impression regarding an utterance. It is to be noted that the voice processing device 1 may perform a voice process of an arbitrary combination of the processes in the working examples 1 to 3. With the voice processing device 1 according to the working example 3, an impression regarding an utterance of a first user given to a second user may be evaluated with a higher degree of accuracy.

Working Example 4

The detection unit 3 depicted in FIG. 1 may otherwise detect first and second signal qualities of a plurality of frames included in first and second voices, and the specification unit 4 may specify a section within which the first and second signal qualities are equal to or higher than a third threshold value (for example, the third threshold value=−60 dBov) and besides the first and second utterance sections overlap with each other as an overlapping section. It is to be noted that the first or second signal quality may be a power or a signal-to-noise ratio of the first or second voice. For example, the specification unit 4 may specify an overlapping section when both of the first and second users are uttering with powers equal to or higher than a given power (sound volume). This is because it is supposed that one of the first and second users is uttering with a comparatively low power, which does not influence on an impression regarding an utterance significantly. The detection unit 3 may calculate average powers P1 and P2 within first and second utterance sections in accordance with the expression given below in addition to the (expression 1) given hereinabove. It is to be noted that the average powers P1 and P2 may be referred to as first signal quality and second signal quality, respectively.

$$P1(t) = \frac{1}{TH1} \sum_{t=Ts-TH1}^{Ts} S_1^2(t)$$

$$P2(t) = \frac{1}{TH1} \sum_{t=Ts-TH1}^{Ts} S_2^2(t)$$

(Expression 10)

In the (expression 10) above, $s_1(t)$ and $s_2(t)$ represent amplitudes of the first and second voices, respectively. The specification unit 4 decides appearance of an overlapping section on the basis of a result of comparison between average powers in the first and second utterance sections and an arbitrary threshold value $TH\_P$ (which may be referred to as third threshold value) and specify start point time $T_s$ of the overlapping section. In particular, if the average power within the first utterance section and the average power within the second utterance section are equal to or higher than the arbitrary threshold value TH_P, then the situation is that both of the first and second users are uttering with powers higher than a given power (large voices). Therefore, the specification unit 4 decides that an overlap between the utterance sections is found and decides start point time $T_s$ of the overlapping section. Any other case corresponds to a situation in which one of the first and second users is uttering in a low voice. Therefore, in this case, the specification unit 4 decides that an overlapping section is not found and resets the start point time $T_s$ of an overlapping section. It is to be noted that the arbitrary threshold value TH_P may be, for example, −60 [dBov]. It is to be noted that the specification unit 4 may calculate an overlapping section in accordance with the following expression:

if $\{L(t) \geq TH\_L\} \wedge \{P1(t) \geq TH\_P\} \wedge \{P2(t) \geq TH\_P\}$ $T_s = t - TH\_L$ else $T_s = -1$ \hfill (11)

In the (expression 11) above, $T_s = t - TH\_L$ signifies that an overlapping section appears, and $T_s = -1$ signifies that no overlapping section appears.

Also it is possible for the specification unit 4 to specify an overlapping section on the basis of a power difference between the first and second utterance sections. For example, the specification unit 4 decides appearance of an overlapping section on the basis of a result of the comparison between the difference between the average power in the first utterance section and the average power in the second utterance section and the given threshold value, and outputs start point time $T_s$ of the overlapping section. If the overlapping section is longer than an arbitrary threshold value and the difference between the average power in the first utterance section of the first user and the average power in the second utterance section of the second user is smaller than an arbitrary threshold value TH_P_DIFF (which may be referred to as fourth threshold value), this represents a situation in which the first and second users are uttering with sound volumes similar to each other. Therefore, the specification unit 4 decides that an overlapping section of the utterances has appeared. Then, the specification unit 4 outputs the start point time $T_s$ of the overlapping section. In any other case, since this indicates that one of the first and second users is uttering with a low voice, the specification unit 4 decides that an overlapping section has not appeared and resets the appearance time $T_s$ of the overlapping section. It is to be noted that the arbitrary threshold value TH_P_DIFF may be set, for example, to 3 dB. It is to be noted that the specification unit 4 may calculate an overlapping section in accordance with the following expression:

if $\{L(t) \geq TH\_L\} \wedge \{|P1(t) - P2(t)| < TH\_P\_DIFF\}$ $T_s = t - TH\_L$ else $$T_s = -1 \quad (12)$$

In the (expression 12) above, $T_s = t - TH\_L$ signifies that there is an appearance of an overlapping section, and $T_s = -1$ signifies that there is no appearance of an overlapping section. It is to be noted that the voice processing device 1 may perform a voice process of an arbitrary combination of the processes of the working examples 1 to 4. With the voice processing device 1 according to the working example 4, an impression regarding an utterance of a first user given to a second user may be evaluated with a higher degree of accuracy.

Working Example 5

The detection unit 3 may detect first and second signal qualities of a plurality of frames included in first and second voices, and the specification unit 4 may specify a section within which the first and second signal qualities are equal to or higher than a third threshold value (threshold value=10 dB) and besides the first and second utterance sections overlap with each other as overlapping section. It is to be noted that the first or second signal quality may be a power or a signal-to-noise ratio of the first or second voice. For example, the detection unit 3 updates the noise power N1(t) in accordance with the expression given below in response to a decision result $v_1(t)$ regarding the first utterance section. For example, if the tth frame is decided as a non-utterance section, then the detection unit 3 updates the noise power by adding a value obtained by multiplying the frame power by a forgetting factor COEF1. It is to be noted that the forgetting factor COEF1 may be specified, for example, as 0.05.

$$N1(t) = N(t-1) * COEF1 + P1(t) * (1 - COEF1)$$

$$N1(t) = N1(t-1) \quad (13)$$

In the (expression 13) above, the upper stage represents the noise power N1(t) in the case of $v_1(t)=0$ while the lower stage represents the noise power N1(t) in any other case. Further, the detection unit 3 updates the noise power N2(t) similarly to the noise power N1(t) in response to the decision result $v_2(t)$ regarding the second utterance section. Then, the specification unit 4 detects an appearance of an overlapping section when the length of the overlapping section is equal to or greater than the first threshold value TH_L described hereinabove and SNR1(t) that is an example of the first signal quality in the first utterance section and SNR2(t) that is an example of the second signal quality in the second utterance section are equal to or higher than a third threshold value TH_SNR (for example, 10 dB). Then the specification unit 4 specifies the appearance time $T_s$ of the overlapping section in accordance with the following expression:

if $\{L(t) \geq TH\_L\} \wedge \{SNR1(t) \geq TH\_SNR\} \wedge \{SNR2(t) \geq TH\_SNR\}$ $T_s = t - TH\_L$ else $T_s = -1$ (14)

It is to be noted that, in the (expression 14) above, $T_s = t - TH\_L$ signifies that there is an appearance of an overlapping section and $T_s = -1$ signifies there is no appearance of an overlapping section.

Also, the specification unit 4 may specify a section within which the difference between the first and second signal qualities is lower than a fourth threshold value (for example, the fourth threshold value=3 dB) and besides the first and second utterance sections overlap with each other as an overlapping section. The specification unit 4 decides, on the basis of the following expression given below, an appearance of an overlapping section on the basis of a result of comparison between the difference between SNR1(t) that is an example of the first signal quality within the first utterance section and SNR2(t) that is an example of the second signal quality within the second utterance section and the fourth threshold value and specifies the appearance time $T_s$ of the overlapping section. When the length of the overlapping section is equal to or greater than the first threshold value TH_L and the difference between SNR1(t) within the first utterance section and SNR2(t) within the second utterance section is smaller than the fourth threshold value TH_P_DIFF (for example, 3 dB), this signifies a situation that both of the first user and the second user are uttering with magnitudes of voices similar to each other. Therefore, the specification unit 4 decides that an overlap of the utterance sections has appeared. Consequently, the specification unit 4 may specify the appearance time $T_s$ of the overlapping section. In any other case, since this is a situation that one of the first and second users is uttering with a low voice, the specification unit 4 decides that an overlapping section has not appeared and if $\{L(t) \geq TH\_L\} \wedge \{|SNR1(t) - SNR2(t)| < TH\_SNR\_DIFF\}$ $T_s = t - TH\_L$ else $T_s = -1$ (15)

In the (expression 15) above, $T_s = t - TH\_L$ signifies that there is an appearance of an overlapping section, and $T_s = -1$ signifies that there is no appearance of an overlapping section. It is to be noted that the voice processing device 1 may perform a voice process of an arbitrary combination of the processes of the working examples 1 to 5. With the voice processing device 1 according to the working example 5, an impression regarding an utterance of a first user given to a second user may be evaluated with a higher degree of accuracy.

Working Example 6

Figure 7:
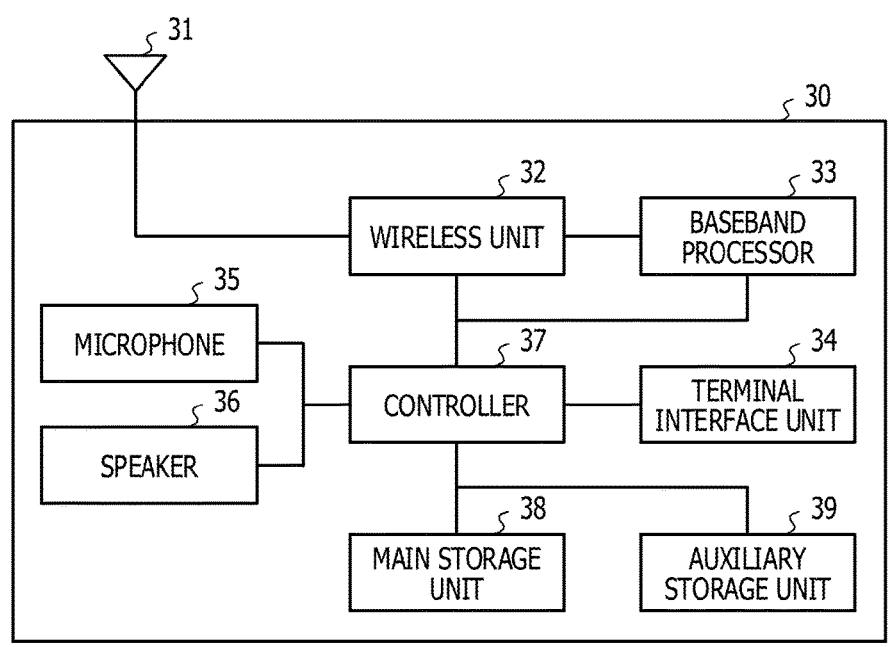
FIG. 7 is a block diagram of hardware that functions as a portable terminal apparatus according to one embodiment.

FIG. 7 is a block diagram of a hardware that functions as a portable terminal device according to one embodiment. Referring to FIG. 7, a portable terminal device 30 includes an antenna 31, a wireless unit 32, a baseband processor 33, a terminal interface unit 34, a microphone 35, a speaker 36, a controller 37, a main storage unit 38, and an auxiliary storage unit 39.

The antenna 31 transmits a wireless signal amplified by a transmission amplifier and receives a wireless signal from a base station. The wireless unit 32 digital-to-analog converts a transmission signal spread by the baseband processor 33, converts the resulting analog transmission signal into a high frequency signal by orthogonal modulation and amplifies the high frequency signal by a power amplifier. The wireless unit 32 amplifies a received wireless signal, analog-to-digital converts the amplified wireless signal and transmits the resulting digital wireless signal to the baseband processor 33.

The baseband processor 33 performs baseband processes of transmission data such as error correction coding and data modulation, decision of a reception signal and a reception environment, a threshold value decision of channel signals and error correction decoding.

The controller 37 is, for example, a central processing unit (CPU), a micro processing unit (MPU), a digital signal processor (DSP), an application specific integrated circuit (ASIC), or a programmable logic device (PLD). The controller 37 performs wireless control such as transmission reception of a control signal. Further, the controller 37 executes a voice processing program stored in the auxiliary storage unit 39 or the like and performs a voice process, for example, of the working example 1 or 2. In other words, the controller 37 may execute processes, for example, of the functional blocks of the acquisition unit 2, the detection unit 3, the specification unit 4, the calculation unit 5, and the evaluation unit 6 depicted in FIG. 1.

The main storage unit 38 is a read only memory (ROM), a random access memory (RAM) or the like and is a storage device for storing or temporarily retaining a program of an operating system (OS) that is basic software to be executed by the controller 37 or application software or data therein.

The auxiliary storage unit 39 is a hard disk drive (HDD), a solid state drive (SDD) or the like and is a storage device for storing data relating to application software and so forth.

The terminal interface unit 34 performs a data adapter process and an interface process with a handset and an external data terminal.

The microphone 35 receives voice of an utterer (for example, the first user) as an input thereto and outputs the voice as a microphone signal to the controller 37. The speaker 36 outputs a signal outputted as output voice or a control signal from the controller 37.

Working Example 7

Figure 8:
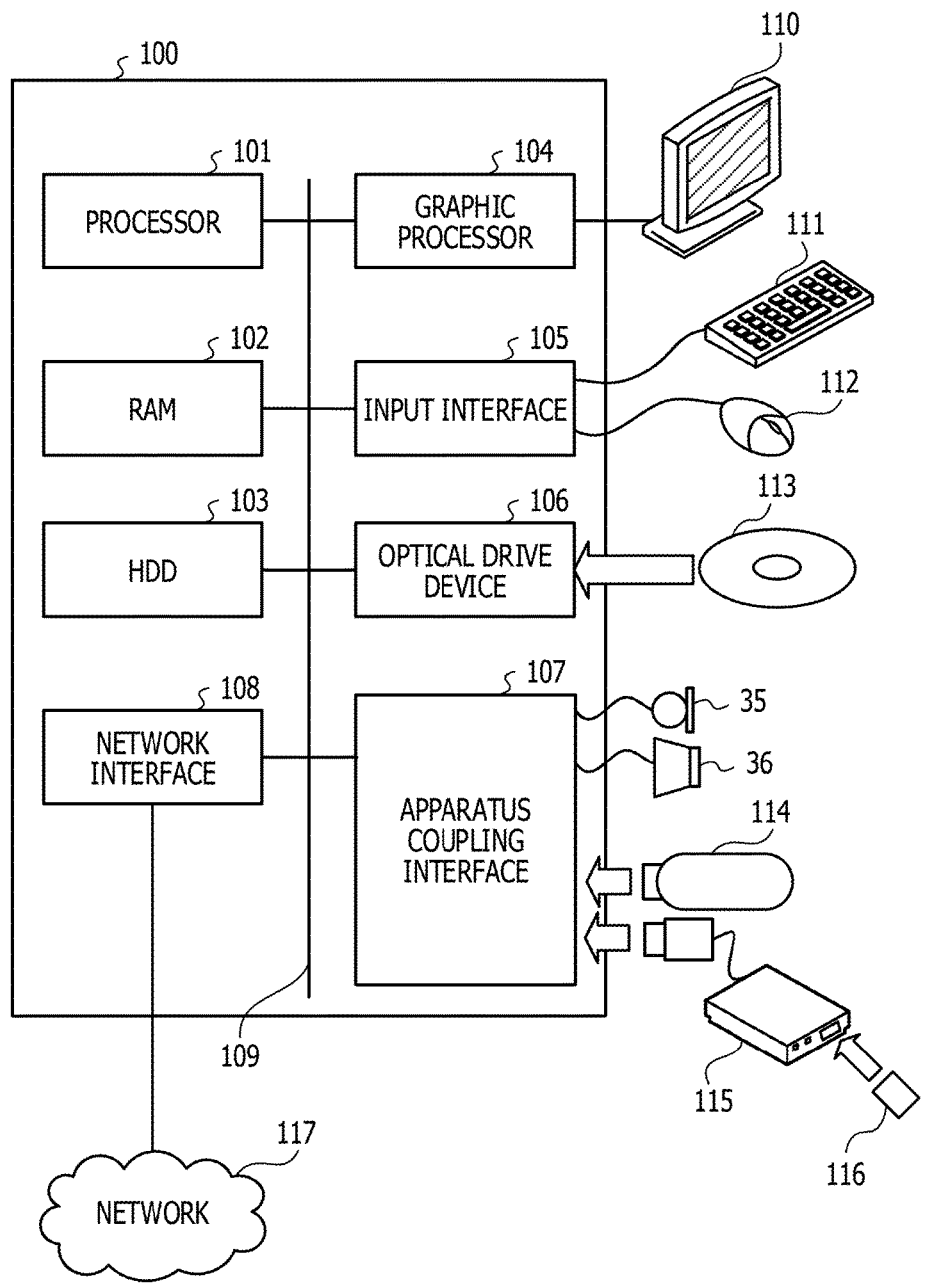
FIG. 8 is a hardware block diagram of a computer that functions as a voice processing device according to one embodiment.

FIG. 8 is a block diagram of a hardware of a computer that functions as a voice processing device according to one embodiment. The voice processing device illustrated in FIG. 8 may be the voice processing device 1 illustrated in FIG. 1. As depicted in FIG. 8, the voice processing device 1 includes a computer 100, and input and output devices (peripheral devices) coupled to the computer 100.

The computer 100 is generally controlled by a processor 101. A RAM 102 and a plurality of peripheral devices are coupled to the processor 101 through a bus 109. It is to be noted that the processor 101 may be a multiprocessor. In addition, the processor 101 is, for example, a CPU, an MPU, a DSP, an ASIC, or a PLD. Moreover, the processor 101 may be an arbitrary combination of two or more of a CPU, an MPU, a DSP, an ASIC, and a PLD. It is to be noted that the processor 101 may execute the processes of the functional blocks depicted in FIG. 1 such as the acquisition unit 2, the detection unit 3, the specification unit 4, the calculation unit 5, and the evaluation unit 6.

The RAM 102 is used as a main storage device of the computer 100. Into the RAM 102, a program of an OS or an application program executed by the processor 101 is temporarily stored at least at part thereof into the RAM 102. Further, various data that may be necessary for processes by the processor 101 are stored into the RAM 102. As peripheral devices, an HDD 103, a graphic processor 104, an input interface 105, an optical drive device 106, an apparatus coupling interface 107, and a network interface 108 are coupled to the bus 109.

The HDD 103 magnetically performs writing and reading out of data on and from a disk built therein. The HDD 103 is used as an auxiliary storage device, for example, of the computer 100. In the HDD 103, a program of an OS, an application program, and various data are stored. It is to be noted that also it is possible to use, as an auxiliary storage device, a semiconductor storage device such as a flash memory.

A monitor 110 is coupled to the graphic processor 104. The graphic processor 104 causes various images to be displayed on a screen of the monitor 110 in accordance with a command from the processor 101. As the monitor 110, a display device that uses a cathode ray tube (CRT), a liquid crystal display device and so forth are available.

A keyboard 111 and a mouse 112 are coupled to the input interface 105. The input interface 105 transmits a signal sent thereto from the keyboard 111 or the mouse 112 to the processor 101. It is to be noted that the mouse 112 is an example of a pointing device, and any other pointing device may be used. As other pointing devices, a touch panel, a tablet, a touch pad, a track ball and so forth are available.

The optical drive device 106 performs reading of data recorded on an optical disk 113 using a laser beam or the like. The optical disk 113 is a portable recording medium on which data are recorded so as to be readable by reflection of light. For the optical disk 113, a digital versatile disc (DVD), a DVD-RAM, a compact disc-ROM (CD-ROM), a CD-recordable/rewritable (CD-R/RW) and so forth may be used. A program stored on the optical disk 113 that is a portable recording medium is installed into the voice processing device 1 through the optical drive device 106. The given installed program may be executed by the voice processing device 1.

The apparatus coupling interface 107 is a communication interface for coupling a peripheral devices to the computer 100. For example, a memory device 114 and a memory reader/writer 115 may be coupled to the apparatus coupling interface 107. The memory device 114 is a recording medium that incorporates a communication function with the apparatus coupling interface 107. The memory reader/writer 115 is a device for performing writing of data into a memory card 116 or reading out of data from the memory card 116. The memory card 116 is a recording medium of the card type. Further, a microphone 35 or a speaker 36 may be coupled to the apparatus coupling interface 107.

The network interface 108 is coupled to a network 117. The network interface 108 performs transmission and reception of data to and from a different computer or a different communication apparatus through the network 117.

The computer 100 executes a program, for example, recorded on a computer-readable recording medium to implement the voice processing function described hereinabove. A program that describes processing contents to be executed by the computer 100 may be recorded into various recording media. The program described may be configured from a single or a plurality of functional modules. For example, the program may be configured from functional modules which implement the acquisition unit 2, the detection unit 3, the specification unit 4, the calculation unit 5, the evaluation unit 6 and so forth depicted in FIG. 1. It is to be noted that the program to be executed by the computer 100 may be stored in the HDD 103. The processor 101 loads at least part of the program in the HDD 103 into the RAM 102 and executes the program. Further, it is possible to record a program to be executed by the computer 100 into a portable recording medium such as the optical disk 113, the memory device 114, or the memory card 116. The program stored in the portable recording medium is enabled for execution after it is installed into the HDD 103, for example, under the control of the processor 101. Also it is possible for the processor 101 to read out a program directly from the portable recording medium and execute the program.

The components of the devices described hereinabove may or may not be configured physically as depicted in the figures. In particular, particular forms of disintegration and integration of the devices are not limited to those depicted in the figures and all or some of them may be disintegrated or integrated functionally of physically in an arbitrary unit in response to various loads, use situations and so forth. Further, the various processes described in the foregoing description of the working examples may be implemented by executing a program prepared in advance on a computer such as a personal computer or a work station.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A voice processing device, comprising:
a memory; and
a processor coupled to the memory and the processor configured to:
acquire a first voice of a first user and a second voice of a second user in conversation with the first user;
detect a first utterance section included in the first voice and a second utterance section included in the second voice, a start point of the first utterance section being earlier than a start point of the second utterance section, a part of the first utterance section and a part of the second utterance section overlapping with each other;
detect an overlap section in which the first utterance section and the second utterance section overlap each other;
determine whether the first utterance section and the second utterance section in the overlap section include vowels equal to or greater than a threshold number;
calculate a length of time of a first utterance continuation section from a start point of the overlap section to an end point of the first utterance section when the first utterance section and the second utterance section in the overlap section include vowels equal to or greater than the threshold number;
determine whether the length of time is equal to or greater than a predetermined threshold;
evaluate an impression regarding the first voice at least on the basis of the length of time, the impression when the length of time is equal to or longer than the predetermined threshold being evaluated as worse impression than the impression when the length of time is shorter than the predetermined threshold; and
output information indicating the evaluated impression to an external device.

2. The voice processing device according to claim 1, wherein the processor is further configured to:
specify an overlapping section where the first utterance section and the second utterance section overlap with each other within a length equal to or greater than a first threshold value.

3. The voice processing device according to claim 1,
wherein the detecting detects a first signal quality and a second signal quality of a plurality of frames included in the first voice and the second voice, and
the processor is further configured to specify, as an overlapping section, a section within which the first signal quality and the second signal quality are equal to or greater than a third threshold value and besides the first utterance section and the second utterance section overlap with each other.

4. The voice processing device according to claim 1,
wherein the detecting detects a first signal quality and a second signal quality of a plurality of frames included in the first voice and the second voice, and
the processor is further configured to specify, as an overlapping section, a section within which a difference between the first signal quality and the second signal quality is smaller than a fourth threshold value and besides the first utterance section and the second utterance section overlap with each other.

5. The voice processing device according to claim 3,
wherein the first signal quality or the second signal quality is a power or a signal-to-noise ratio of the first voice or the second voice.

6. The voice processing device according to claim 1, wherein the processor is further configured to specify an overlapping section after lapse of a time period of a fifth threshold value from start time of earlier one of the first utterance section and the second utterance section.

7. The voice processing device according to claim 6,
wherein the specifying specifies the overlapping section before lapse of a time period of the fifth threshold value from end time of later one of the first utterance section and the second utterance section.

8. The voice processing device according to claim 1,
wherein the first voice or the second voice is a transmission voice or a reception voice.

9. The voice processing device according to claim 1, wherein the processor is further configured to:
specify an overlapping section, the overlapping section being a temporal section at which the part of the first utterance section and the part of the second utterance section overlapping with each other.

10. The voice processing device according to claim 1, wherein the processor is further configured to:
determine, in the detecting of each of the first utterance section and the second utterance section, whether a specified timing is an end point of an utterance section or not based on average signal-to-noise ratio of a plurality of sound frames included in a predetermined temporal section in the past from the timing.

11. The voice processing device according to claim 1, wherein the processor is further configured to:
obtain the first voice and the second voice, the first voice and the second voice including a plurality of frames;
calculate, for the first voice and the second voice, an average signal-to-noise ratio of each of the plurality of frames, the average signal-to-noise ratio being an average of signal-to-noise ratio of a frame and one or a series of frames prior to the frame;
detect the first utterance section and the second utterance section based on the average signal-to-noise ratio, the first utterance section and the second utterance section being a series of frames, each of the series of frames having a signal-to-noise ratio higher than a predetermined threshold.

12. A voice processing method, executed by a computer, comprising:
- acquiring a first voice of a first user and a second voice of a second user in conversation with the first user;
- detecting a first utterance section included in the first voice and a second utterance section included in the second voice, a start point of the first utterance section being earlier than a start point of the second utterance section, a part of the first utterance section and a part of the second utterance section overlapping with each other;
- detecting an overlap section in which the first utterance section and the second utterance section overlap each other;
- determining whether the first utterance section and the second utterance section in the overlap section include vowels equal to or greater than a threshold number;
- calculating a length of time of a first utterance continuation section from a start point of the overlap section to an end point of the first utterance section when the first utterance section and the second utterance section in the overlap section include vowels equal to or greater than the threshold number;
- determining whether the length of time is equal to or greater than a predetermined threshold;
- evaluating an impression regarding the first voice at least on the basis of the length of time such that the impression when the length of time is equal to or longer than the predetermined threshold is to be evaluated as worse impression than the impression when the length of time is shorter than the predetermined threshold; and
- outputting information indicating the evaluated impression to an external device.

13. The voice processing method according to claim 12, further comprising:
- specifying an overlapping section where the first utterance section and the second utterance section overlap with each other within a length equal to or greater than a first threshold value.

14. The voice processing method according to claim 12, wherein the detecting detects a first signal quality and a second signal quality of a plurality of frames included in the first voice and the second voice, and
the method further comprising specifying, as the overlapping section, a section within which the first signal quality and the second signal quality are equal to or greater than a third threshold value and besides the first utterance section and the second utterance section overlap with each other.

15. The voice processing method according to claim 12, wherein the detecting detects a first signal quality and a second signal quality of a plurality of frames included in the first voice and the second voice, and
the method further comprising specifying, as the overlapping section, a section within which a difference between the first signal quality and the second signal quality is smaller than a fourth threshold value and besides the first utterance section and the second utterance section overlap with each other.

16. The voice processing method according to claim 12, further comprising:
- specifying an overlapping section after lapse of a time period of a fifth threshold value from start time of earlier one of the first utterance section and the second utterance section.

17. The voice processing method according to claim 12, further comprising:
- specifying an overlapping section, the overlapping section being a temporal section at which the part of the first utterance section and the part of the second utterance section overlapping with each other.

18. A non-transitory computer-readable medium that stores a voice processing program for causing a computer to execute a process, comprising:
- acquiring a first voice of a first user and a second voice of a second user in conversation with the first user;
- detecting a first utterance section included in the first voice and a second utterance section included in the second voice, a start point of the first utterance section being earlier than a start point of the second utterance section, a part of the first utterance section and a part of the second utterance section overlapping with each other;
- detecting an overlap section in which the first utterance section and the second utterance section overlap each other;
- determining whether the first utterance section and the second utterance section in the overlap section include vowels equal to or greater than a threshold number;
- calculating a length of time of a first utterance continuation section from a start point of the overlap section to an end point of the first utterance section when the first utterance section and the second utterance section in the overlap section include vowels equal to or greater than the threshold number;
- determining whether the length of time is equal to or greater than a predetermined threshold;
- evaluating an impression regarding the first voice at least on the basis of the length of time such that the impression when the length of time is equal to or longer than the predetermined threshold is to be evaluated as worse impression than the impression when the length of time is shorter than the predetermined threshold; and
- outputting information indicating the evaluated impression to an external device.

* * * * *